US007490203B2

(12) United States Patent
Hsu et al.

(10) Patent No.: US 7,490,203 B2
(45) Date of Patent: Feb. 10, 2009

(54) METHOD FOR DUMPING DATA IN PROCESSING SYSTEMS TO A SHARED STORAGE

(75) Inventors: Yu-Cheng Hsu, Tucson, AZ (US); David Frank Mannenbach, Tucson, AZ (US); Glenn Rowan Wightwick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 11/128,816

(22) Filed: May 12, 2005

(65) Prior Publication Data

US 2006/0259708 A1 Nov. 16, 2006

(51) Int. Cl.
*G06F 13/28* (2006.01)
(52) U.S. Cl. .................. 711/147; 711/148; 711/151; 711/153; 711/170; 711/171; 711/172; 711/173; 714/15; 714/24
(58) Field of Classification Search .................. None
See application file for complete search history.

(56) References Cited

U.S. PATENT DOCUMENTS

| 5,519,831 | A | | 5/1996 | Holzhammer |
| 5,829,041 | A | * | 10/1998 | Okamoto et al. ............ 711/147 |
| 6,295,577 | B1 | | 9/2001 | Anderson et al. |
| 6,336,174 | B1 | | 1/2002 | Li et al. |
| 6,449,696 | B2 | | 9/2002 | Okayasu |
| 6,490,659 | B1 | | 12/2002 | McKean et al. |
| 6,535,996 | B1 | | 3/2003 | Brewer et al. |
| 6,792,559 | B1 | * | 9/2004 | Cohen et al. .................. 714/15 |
| 7,328,437 | B2 | * | 2/2008 | Donovan et al. ............... 718/1 |
| 7,360,030 | B1 | * | 4/2008 | Georgiev .................... 711/141 |
| 2002/0052914 | A1 | * | 5/2002 | Zalewski et al. ............ 709/203 |
| 2002/0083368 | A1 | | 6/2002 | Abe et al. |
| 2002/0129274 | A1 | * | 9/2002 | Baskey et al. ............... 713/201 |
| 2003/0126494 | A1 | | 7/2003 | Strasser |
| 2003/0233525 | A1 | | 12/2003 | Reeves |

FOREIGN PATENT DOCUMENTS

EP 0 433 979 A2 6/1991

OTHER PUBLICATIONS

PCT International Search Report and Written Opinion, Application No. PCT/EP2006/062233, filed May 11, 2006.
H.H. Chao. "Static Ram with Nonvolatile Backup Memory", IBM Corp., Technical Disclosure Bulletin, vol. 24, No. 5, Oct. 1981, Document No. 81A007519, pp. 2456-2457.
J.P. Kubala, et al., "Coordinating Multiple Server Partitions to Enter Power-Save State", IBM Corp., Technical Disclosure Bulletin, vol. 39, No. 6, Jun. 1996, pp. 235-240.

* cited by examiner

*Primary Examiner*—Hyung S Sough
*Assistant Examiner*—Kaushikkumar Patel
(74) *Attorney, Agent, or Firm*—David W. Victor; Konrad Raynes & Victor LLP

(57) ABSTRACT

Provided are a method, system and program for dumping data in processing systems to a shared storage. A plurality of processing systems receive a signal indicating an event. Each of the processing systems write data used by the processing system to a shared storage device in response to receiving the signal, wherein each processing system writes the data to the shared storage device.

7 Claims, 3 Drawing Sheets

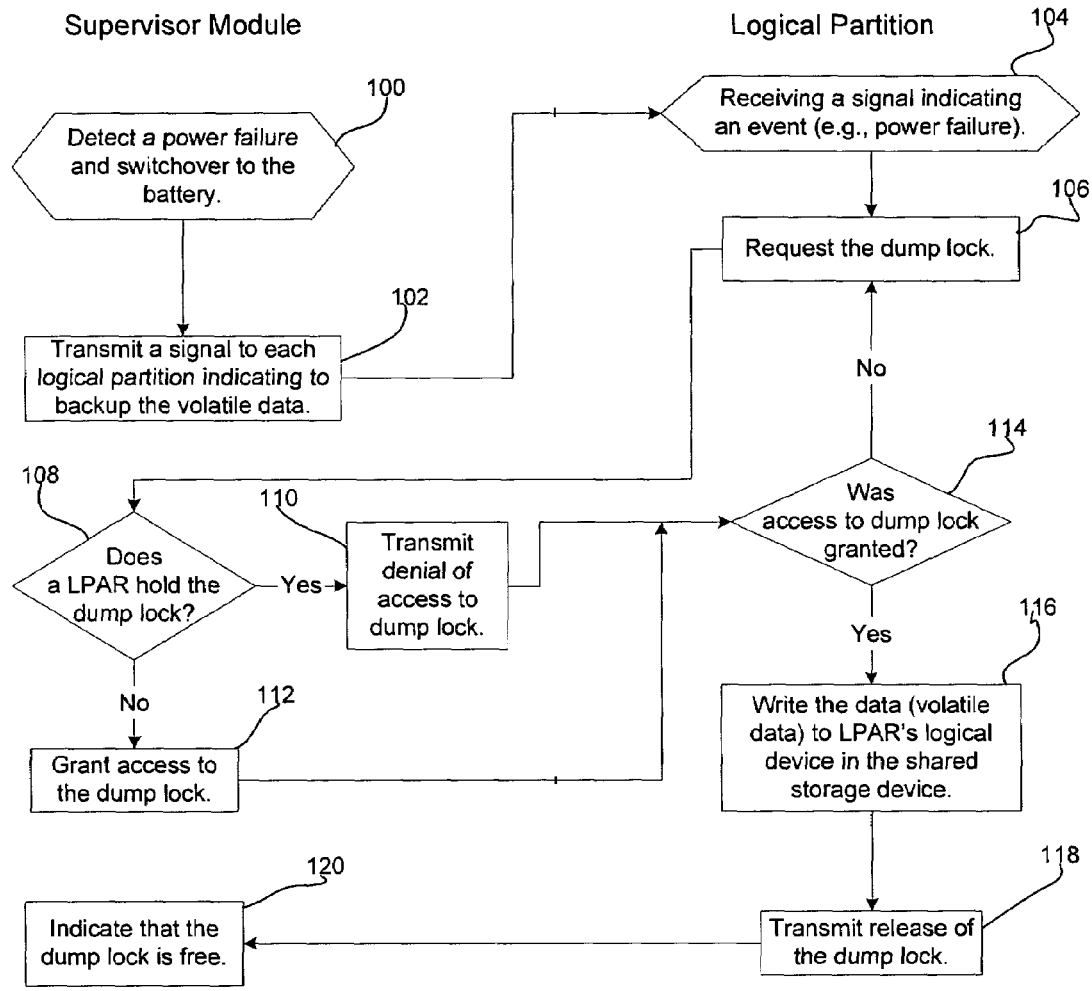

METHOD FOR DUMPING DATA IN PROCESSING SYSTEMS TO A SHARED STORAGE

BACKGROUND OF THE INVENTION

1. Field of the Invention

The present invention relates to a method, system, and program for dumping data in processing systems to a shared storage.

2. Description of the Related Art

In certain computing environments, multiple host systems may communicate with a control unit, such as an IBM Enterprise Storage Server (ESS)®, for data in a storage device managed by the ESS receiving the request. (IBM and ESS are registered trademarks of IBM). The control unit provides access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may include duplicate and redundant processing complexes, also known as clusters, to allow for failover to a surviving cluster in case one fails. The clusters may access shared devices.

The control unit may include one or more processing complexes, where each processing complex includes a processor, memory and other interface hardware on a separate power boundary. The processing complex may include multiple logical partitions (LPARs), each executing a separate instance of the operating system code and each functioning as an independent system, sharing the same processing complex hardware. In certain systems, a separate set of storage devices, such as one or more hard disk drives, is provided for each logical partition for use by the logical partition to dump volatile data in the event of a power failure or other failure event. In the event of such failure, each logical partition would write its volatile data to its separate dump storage device while a battery maintains power to the system for a finite time. The dedicated storage device for each logical partition may include redundant hardware to store redundant copies of the volatile data for the logical partition assigned to that storage device. When the power is resumed, the data stored or "dumped" to the storage device for the logical partition is read back into the logical partition so operations may resume.

SUMMARY

Provided are a method, system and program for dumping data in processing systems to a shared storage. A plurality of processing systems receive a signal indicating an event. Each of the processing systems write data used by the processing system to a shared storage device in response to receiving the signal, wherein each processing system writes the data to the shared storage device.

BRIEF DESCRIPTION OF THE DRAWINGS

FIG. 3 illustrates an embodiment of operations to write data from logical partitions to a shared storage device.

DETAILED DESCRIPTION

Figure 1:
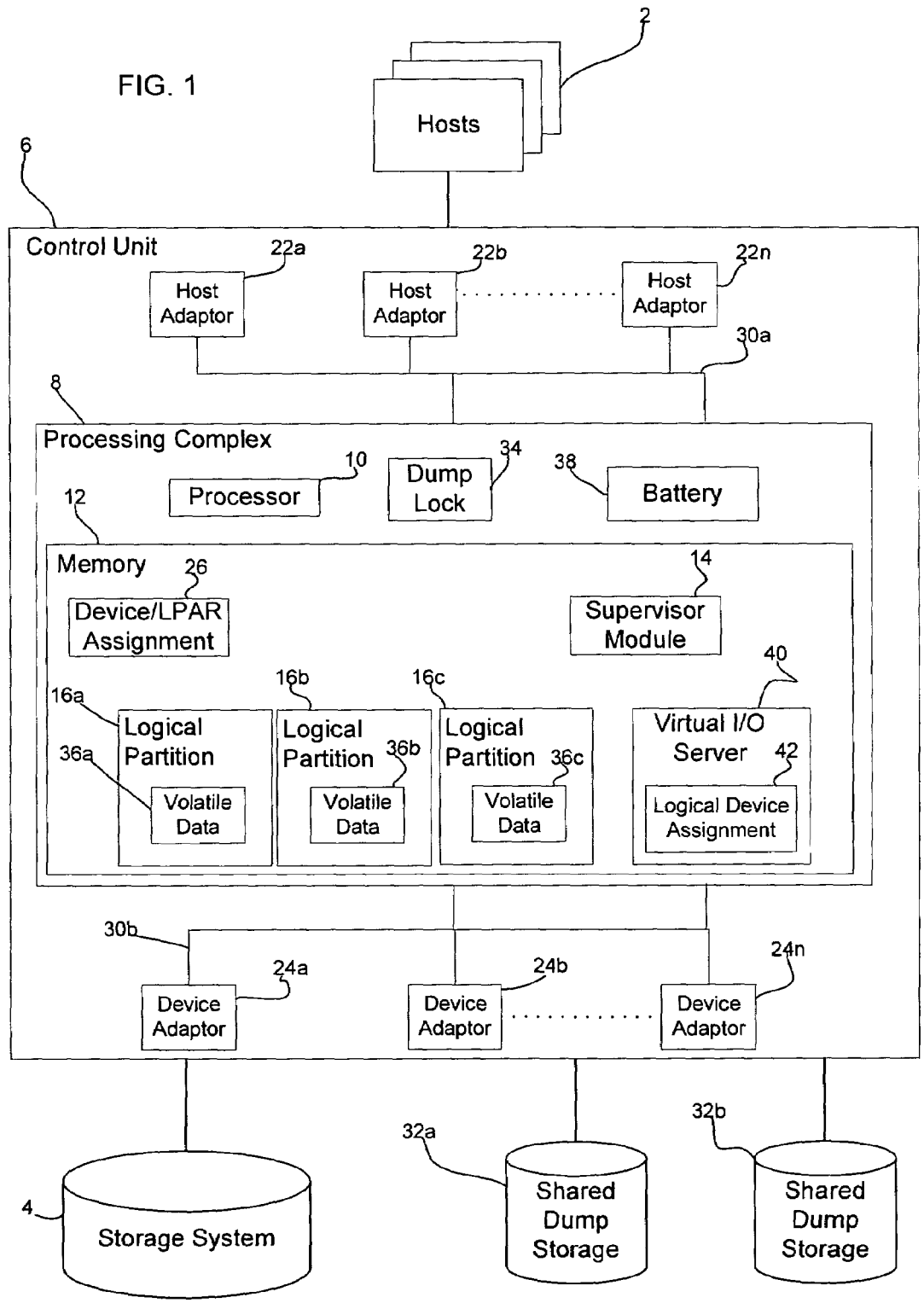
FIG. 1 illustrates a computing environment in which embodiments are implemented.
Figure 2:
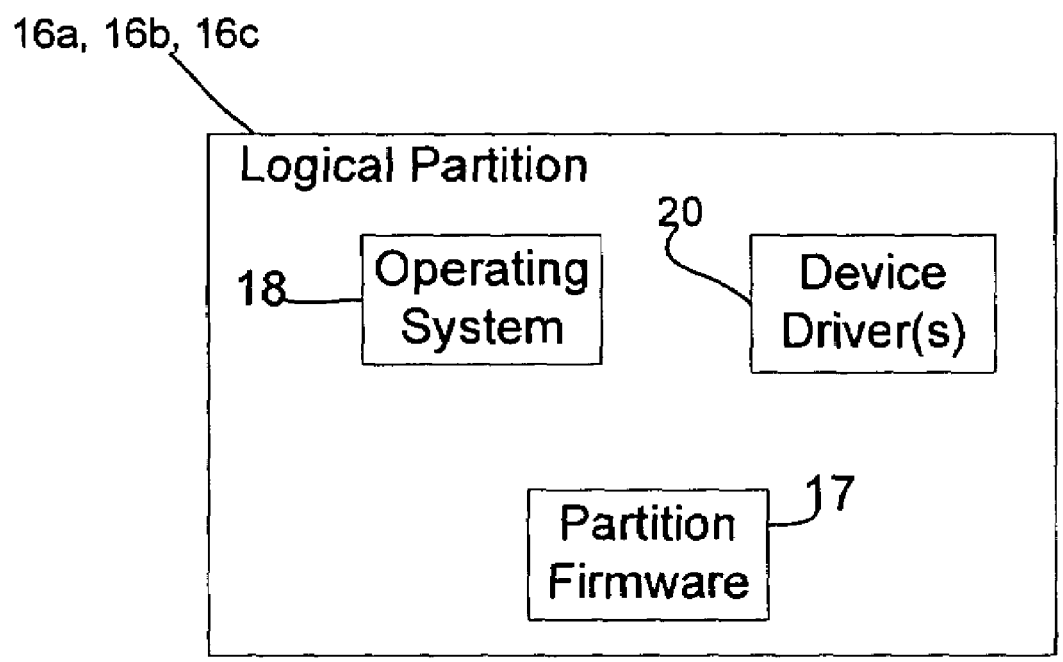
FIG. 2 illustrates an embodiment of a logical partition.

FIG. 1 illustrates a computing environment in which aspects of the invention are implemented. One or more hosts 2 communicate Input/Output (I/O) requests directed to a storage system 4 to a control unit 6, where the control unit 6 manages access to the storage system 4. In one embodiment, the control unit 6 is comprised of one or more processing complexes 8 (only one is shown), including one or more processors 10 (only one is shown) and a memory 12. The complex 8 includes a supervisor module 14 (also known as a "hypervisor" in-certain systems) comprising code that manages and coordinates the operations of one or more logical partitions (LPARS) 16a, 16b, 16c executing in the processing complex 8. FIG. 2 illustrates components in each logical partition 16a, 16b, 16c, including an operating system 18 and device drivers 20. The logical partitions comprise a division of the processor 10 resources into logical independent processing systems each having their own partition firmware 17, operating system 18, and device drivers 20. Multiple logical partitions 16a, 16b, 16c may execute in each processing complex 8, managed by the supervisor 14 module for that complex 8. Each logical partition 16a, 16b, 16c includes partition code 17 to manage partition related operations, such as communicating and coordinating with the supervisor module 14.

Each device driver 20 provides an interface between the operating system 18 in the logical partition 16a, 16b, 16c in which the device driver 20 executes, and an external device, such as host adaptors 22a, 22b . . . 22n, device adaptors 24a, 24b . . . 24n, storage system 4, etc. The host adaptors 22a, 22b . . . 22n enable the processing complex 8 to communicate with the hosts 2 and the device adaptors 24a, 24b . . . 24n enable the logical partitions 16a, 16b, 16c to communicate with the storage system 4 and shared dump storage 32a, 32b. Thus, the logical partitions 16a, 16b, 16c share devices, such as adaptors 22a, 22b . . . 22n, 24a, 24b . . . 24n, the storage system 4, and shared dump storage 32a, 32b. The variable "n" is used to denote an integer instance of an element, and may indicate different or the same integer value when used with different elements. For instance, 22n and 24n may indicate a same or different number of host adaptors 22n and device adaptors 24n.

The logical partitions 16a, 16b, 16c communicate with the host adaptors 22a, 22b . . . 22n over a fabric 30a and the device adaptors 24a, 24b . . . 24n over a fabric 30b. The fabrics 30a, 30b may comprise one or more interfaces providing communication paths between the logical partitions 16a, 16b, 16c and adaptors. In one embodiment, the fabrics 30a, 30b may comprise a Fibre Channel arbitrated loop configuration, a serial loop architecture or a bus interface, such as a Peripheral Component Interconnect (PCI) interface. Each logical partition 16a, 16b, 16c may be assigned a portion of the adaptors 22a, 22b . . . 22n, 24a, 24b . . . 24n and during initialization, the supervisor module 14 initializes portions of the fabrics 30a, 30b providing communication paths with the adaptors that are assigned to that processing complex.

The module 14 maintains device/logical partition (LPAR) assignments 26a, 26b identifying an assignment of the adaptors 22a, 22b . . . 22n, 24a, 24b . . . 24n to a logical partition 16a, 16b, 16c in the processing complex 8, such that communication between a specific adaptor 22a, 22b . . . 22n, 24a, 24b . . . 24n and the processing complex 8 is handled by the device driver 20 (FIG. 2) executing in the logical partition 16a, 16b, 16c assigned to the specific adaptor 22a, 22b . . . 22n, 24a, 24b . . . 24n.

The supervisor module 14 maintains a dump lock 34 used to serialize logical partition 16a, 16b, 16c access to the shared dump storages 32a, 32b, which may comprise hard disk drives. The dump lock 34 may be implemented in hardware registers of the processing complex 8 accessible to the supervisor module 14 or, in an alternative embodiment, implemented in the memory 12. The logical partitions 16a, 16b, 16c may dump volatile data 36a, 36b, 36c, such as critical data, in their memories to the dump storages 32a, 32b in the event the supervisor module 14 detects a power failure or loss of power (or other failure that may lead to a system shutdown) in the processing complex 8. After a power failure, the processing complex 8 receives power from a battery 38. The battery 38 may be internal to the control unit 6 or an external backup power supply. Volatile data 36a, 36b, 36c may be written separately to each shared dump storage 32a, 32b to provide redundancy of the data by storing a copy of the volatile data 36a, 36b, 36c in separate storage devices 32a, 32b. Each shared dump storage 32a, 32b may comprise one or more hard disk drives or other non-volatile storage devices.

In one embodiment, a virtual I/O server 40 manages access to the shared dump storages 32a, 32b by configuring logical devices in the shared dump storages 32a, 32b to assign to each logical partition 16a, 16b, 16c. A logical device assignment 42 maintains information on the assignment of logical devices configured in the shared dump storages 32a, 32b to the logical partitions 16a, 16b, 16c. In one embodiment, the logical partitions 16a, 16b, 16c write their volatile data 36a, 36b, 36c to a logical device at the virtual I/O server 40, which then manages the transfer of the volatile data 36a, 36b, 36c to the location in the shared storages 32a, 32b associated with the logical device. In one embodiment, the virtual I/O server 40 may assign a logical device for a logical partition 16a, 16b, 16c starting at a storage location offset in the shared dump storage 32a, 32b that is based on an identifier of the logical partition 16a, 16b, 16c. For instance, the logical partition ID may be used as an index to calculate the location in the share dump storage 32a, 32b at which the logical partition 16a, 16b, 16c writes the volatile data 36a, 36b, 36c so that each logical device is configured in a separate, non-overlapping storage location in the shared dump storage 32a, 32b. Each logical device may be implemented in both dump storages 32a and 32b, such that dump storage 32b mirrors the data in dump storage 32a to provide redundancy of the dumped data.

The control unit 6 may comprise any type of server, such as an enterprise storage server, storage controller, general purpose server, etc., or other device used to manage I/O requests to attached storage system (s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the control unit 6, via the adaptors 22a, 22b. . . 22n, over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface.

FIG. 3a illustrates an embodiment of operations performed by the supervisor module 14 and FIG. 3b illustrates an embodiment of operations performed by each logical partition 16a, 16b, 16c. The logical partition 16a, 16b, 16c operations may be performed by the LPAR operating system 18, device driver 20 and/or the partition firmware 17. In an alternative embodiment, the operations described as performed by a logical partition executing in a same processing complex 8 may instead by performed by other types of processing systems, including logical partitions in different processing complexes, processing systems implemented in separate hardware devices and enclosures, etc. A processing system, such as the logical partitions 16a, 16b, 16c, comprises a combination of software and/or hardware that performs separate processing operations and maintains separate volatile data that needs to be written to the shared dump storage 32a, 32b.

Control begins at block 100 (FIG. 3a) with the supervisor module 14 detecting a loss of power or power failure within the processing complex 8. At this point, the processing complex 8 switches to operating from the battery 38 for a limited time to allow volatile data 36a, 36b, 36c in the logical partitions 16a, 16b, 16c to be written to the shared dump storage 32a, 32b. The supervisor module 14 transmits (at block 102) a signal to each logical partition 16a, 16b, 16c that indicates to the logical partitions 16a, 16b, 16c to backup their volatile data 36a, 36b, 36c. In response to receiving the signal (at block 104), each logical partition 16a, 16b, 16c requests (at block 106) the dump lock 34 from the supervisor module 14.

In response to the lock request, the supervisor module 14 determines (at block 108) whether a logical partition 16a, 16b, 16c already holds the dump lock 34. The supervisor module 14 may queue lock requests from the logical partitions 16a, 16b, 16c and process on a first-in-first-out (FIFO) basis. If (at block 108) one logical partition 16a, 16b, 16c already owns the dump lock 34, then the supervisor module 14 transmits (at block 110) a denial of access to the dump lock 34 to the requesting logical partition 16a, 16b, 16c. Otherwise, if (at block 108) no logical partition 16a, 16b, 16c holds the dump lock 34, then the supervisor module 14 grants (at block 112) access to the dump lock 34 to the requesting logical partition 16a, 16b, 16c.

Upon the logical partition 16a, 16b, 16c receiving a response to its request to access the dump lock 34, the logical partition 16a, 16b, 16c determines (at block 114) whether access to the dump lock 34 was granted. If not, then control returns to block 106 to again request the lock. In one embodiment, the logical partition 16a, 16b, 16c may delay its additional lock request for a delay time. In an alternative embodiment, the logical partition 16a, 16b, 16c may immediately transmit the additional lock request. In a still further embodiment, the logical partitions 16a, 16b, 16c may provide a callback function to the supervisor module 14 to have the supervisor module 14 contact the logical partitions 16a, 16b, 16c when granting access. If (at block 114) the dump lock 34 was granted, then the logical partition 16a, 16b, 16c granted the lock writes (at block 116) its critical volatile data 36a, 36b, 36c to the assigned logical device assigned to the logical partition 16a, 16b, 16c in the shared dump storage 32a, 32b.

As discussed, in one embodiment, the virtual I/O server 40 maintains a logical device assignment 42 indicating one logical device assigned to each logical partition 16a, 16b, 16c, where each logical partition 16a, 16b, 16c writes its volatile data 36a, 36b, 36c to its assigned logical device, and where each logical device is implemented at a separate physical location in the shared storage device 32a, 32b. The logical partitions 16a, 16b, 16c may transmit their writes to the shared dump storage 32a, 32b to the virtual I/O server 40. Further, in certain embodiments, each logical device is defined to begin at an offset within the shared storage device 32a, 32b, wherein the offset for the logical device is based on an identifier of the logical partition 16a, 16b, 16c assigned to the logical device. After writing the data 36a, 36b, 36c, the logical partition 16a, 16b, 16c transmits (at block 118) the release of the dump lock 34 to the supervisor module 14. The supervisor module 14 indicates (at block 120) that the dump lock 34 is free and available for granting in response to receiving the release from one logical partition 16a, 16b, 16c .

With the described embodiments, the logical partitions write volatile data to a shared dump storage in response to an event, such as a power failure or other type of failure event, indicating the system may soon shutdown. In certain embodiments, the logical partition access to the shared dump storage is serialized to ensure that each logical partition can complete writing its data sequentially to the shared dump storage.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain embodiments may be directed to a method for deploying computing instruction by a person or automated processing integrating computer-readable code into a computing system, wherein the code in combination with the computing system is enabled to perform the operations of the described embodiments.

In embodiments where the processing complex has multiple logical partitions, the supervisor module manages the execution of different logical partitions. In embodiments, where the processing complex does not have logical partitions, the supervisor module may comprise an intermediate device driver.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous ommunication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The variable "n" indicates an integer number of instances of an element, and may take different values when used with different elements, such that 56*n* and 86*n* may indicate a same or different number of instances of the field information and field authorization, respectively.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The embodiment of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
assigning each of a plurality of processing systems a logical device implemented in a shared storage device, wherein each logical device is implemented at a separate location on the shared storage device and wherein the processing systems write data to the shared storage device by writing to the logical devices to which they are assigned;
receiving, at the plurality of processing systems, a signal indicating a failure in a processing complex including the processing systems;
requesting a lock, by the processing systems, in response to the signal;
writing, by each of the processing systems, data used by the processing system to the logical device assigned to the processing system in the shared storage device in response to receiving the signal and in response to obtaining the requested lock; and
releasing, by the processing system holding the lock, the lock in response to writing the data to the shared storage device.

2. The method of claim 1, wherein each processing system comprises a logical partition executing in the processing complex and wherein the data written to the shared storage device comprises critical volatile data maintained by the logical partition.

3. The method of claim 1, further comprising:
initiating an additional request for the lock, by each processing system, in response to the request for the lock being denied.

4. The method of claim 1, wherein the request for the lock is transmitted to a module coordinating access to resources by the processing systems, wherein the module performs:
granting the lock to one requesting processing system in response to determining that no processing system holds the lock;
indicating that the lock is free in response to receiving the release of the lock from the processing system; and
transmitting a denial of access to the lock to one processing system requesting the lock in response to determining that one processing system holds the lock.

5. The method of claim 1, wherein processing system access to the shared storage device is serialized, and wherein each processing system writes data sequentially to the shared storage device.

6. The method of claim 1, wherein a virtual Input/Output (I/O) server manages access to the shared device and assigns the logical devices to the processing systems, and wherein each processing system writes the data to the virtual I/O server.

7. The method of claim 1, wherein each logical device is defined to begin at an offset within the shared storage device, wherein the offset for the logical device is based on a logical partition identifier for the logical partition assigned to the logical device.

* * * * *